(12) United States Patent
Doerner et al.

(10) Patent No.: US 8,279,428 B2
(45) Date of Patent: Oct. 2, 2012

(54) SCALE WITH CORNER LOAD SENSOR AND METHOD FOR MEASURING TILTS RESULTING FROM CORNER LOADS

(75) Inventors: Jochen Doerner, Goettingen (DE); Christian Schrader, Bodenfelde (DE); Ralf Mueller, Mittweida (DE)

(73) Assignee: Sartorius Weighing Technology GmbH, Goettingen (DE)

( * ) Notice: Subject to any disclaimer, the term of this patent is extended or adjusted under 35 U.S.C. 154(b) by 179 days.

(21) Appl. No.: 12/766,320

(22) Filed: Apr. 23, 2010

(65) Prior Publication Data

US 2010/0271624 A1   Oct. 28, 2010

(30) Foreign Application Priority Data

Apr. 23, 2009   (DE) .......................... 10 2009 002 599

(51) Int. Cl.
*G01B 3/26* (2006.01)
(52) U.S. Cl. ................... 356/139.01; 356/139; 356/138; 33/366.16; 250/206.1
(58) Field of Classification Search ........ 356/3.01–28.5, 356/139.01–139.1
See application file for complete search history.

(56) References Cited

U.S. PATENT DOCUMENTS

| | | | | |
|---|---|---|---|---|
| 4,750,574 A * | 6/1988 | Williams | ................ | 177/25.19 |
| 2006/0164630 A1* | 7/2006 | Hofbauer | ................ | 356/141.1 |
| 2009/0114455 A1* | 5/2009 | Mueller et al. | ................ | 177/211 |

FOREIGN PATENT DOCUMENTS

| | | |
|---|---|---|
| DE | 3003862 A1 | 8/1981 |
| DE | 3811942 A1 | 10/1989 |
| DE | 19502694 C1 | 8/1996 |
| DE | 29918562 U1 | 4/2000 |
| DE | 102006031950 B3 | 11/2007 |
| WO | 2004113832 A1 | 12/2004 |

* cited by examiner

*Primary Examiner* — Luke Ratcliffe
(74) *Attorney, Agent, or Firm* — Sughrue Mion, PLLC

(57) ABSTRACT

A weighing scale, e.g. a top-pan scale, having a scale pan (01, 02) supported on a force transducer, and a corner load sensor (03, 04, 06, 08, 09) measuring the tilting of the scale pan (01, 02) relative to the force transducer. The corner load sensor includes a light beam source (03, 04, 06) emitting a first light beam and a second light beam. The first light beam and the second light beam are directed toward a reflecting surface on an underside of an arrangement that includes the scale pan (01, 02). The first light beam and the second light beam are respectively inclined relative to the reflecting surface of the untilted scale pan (01). The corner load sensor (03, 04, 06, 08, 09) of the scale also includes a first optical sensor (08) measuring the first light beam reflected by the reflecting surface. If no corner load exists, a predetermined proportion (12) of the reflected first light beam is directed to the first optical sensor (08). If the scale pan (02) is tilted, the proportions of the reflected light beams which fall on the two optical sensors (08, 09) change. The corner load sensor (03, 04, 06, 08, 09) has an evaluating unit determining the tilt of the scale pan (01, 02) dependent on the light quantities measured with the two optical sensors (08, 09).

19 Claims, 11 Drawing Sheets

SCALE WITH CORNER LOAD SENSOR AND METHOD FOR MEASURING TILTS RESULTING FROM CORNER LOADS

The following disclosure is based on German Patent Application No. 10 2009 002 599.5, filed on Apr. 23, 2009, which is incorporated into this application by reference.

FIELD AND BACKGROUND OF THE INVENTION

The present invention relates to weighing scales, and in particular to top-pan scales comprising a scale pan supported on a force transducer and having a corner load sensor for measuring tilting of the scale pan relative to the force transducer. The invention also relates to methods for measuring tilting of a scale pan relative to a force transducer which supports the scale pan, caused by corner loads in a top-pan scale.

Publication DE 30 03 862 A1, which is hereby incorporated by reference into the present application, discloses an electronic scale comprising a scale pan and parallel guidance for the load pan. In order to reduce corner load errors, the parallel guidance has adjusting elements which are provided only for coarse adjustment. At least one sensor is provided, which measures the torques transmitted from the load pan to the parallel guidance, with which torques the weight value output by the scale can be corrected.

Reference DE 299 18 562 U1, which is hereby incorporated by reference into the present application, discloses a scale with a scale pan for placing the goods being weighed and having a force measuring cell which supports the scale pan. The scale has means for providing the common center of gravity of the goods being weighed together with the scale pan in the force measuring direction of the force measuring cell. For this purpose, at least two force measuring cells are arranged on the scale pan one above the other and spaced apart from the axis of the force measuring direction.

Publication DE 38 11 942 A1, which is hereby incorporated by reference into the present application, discloses an electronic scale including a corner load sensor. The scale has a scale pan which is supported above a lower pan on a load transducer. Using the corner load sensor, the torques transmitted from the scale pan to the load transducer can be measured. The lower pan is configured to be elastically flexible, wherein at least three distance sensors which measure the bending of the lower pan dependent on the size of the load and the position of the load on the scale pan are provided on the force transducer. As distance sensors, for example, eddy current sensors or optical distance sensors are proposed. However, the accuracy achievable with distance sensors of this type is not sufficient for many applications.

Patent DE 195 02 694 C1, which is hereby incorporated by reference into the present application, discloses an electronic scale having a load transducer and a capacitive corner load sensor. The corner load sensor serves to measure the torque acting on the load transducer and includes at least three horizontal electrodes and a horizontal counter-electrode, wherein either the electrodes or the counter-electrode are fastened to the load transducer. When a corner load acts, the capacitances formed between the electrodes and the counter-electrodes are changed. Evaluation of these changes permits conclusions to be drawn concerning corner loads that are present. The accuracy achievable with this solution is also not sufficient for many applications.

Reference DE 10 2006 031 950 B3, which is hereby incorporated by reference into the present application, discloses a top-pan scale having a scale pan and a corner load sensor. The scale pan is supported on at least one force transducer of a force measuring system. The corner load sensor emits a signal as soon as the goods being weighed on the scale pan are in an off-center position. The corner load sensor has a planar underside with which the sensor is fastened to the scale pan or a lower pan of the scale. The corner load sensor also has a planar upper side onto which the scale pan is placed. The corner load sensor is linked via a force-transfer-free connection to a correction electronic system of fixed location. The force-transfer-free connection can be implemented with a radio link or an optical link. Using this solution, electric conductors which run to the corner load sensor and could therefore falsify the measurement result are avoided. However, this solution requires a high level of outlay to provide the force-transfer-free connection.

OBJECTS AND SUMMARY OF THE INVENTION

It is an object of the present invention to provide a scale with a corner load sensor for measuring tilting of the scale pan, wherein the corner load sensor provides highly accurate measurements and can be implemented with relatively modest outlay. It is a further object of the invention to provide a method for measuring tilting of a scale pan of a scale caused by corner loads, which method facilitates highly accurate measurements without relatively high expenditure.

The scale according to the invention is, for example, a top-pan scale comprising a scale pan supported on at least one force transducer of a force measuring system. As will be evident to a person skilled in the art upon reviewing the description below, the principles underlying the invention can also be implemented in a bottom-pan scale suspended on at least one force transducer. The scale pan is configured to receive the goods being weighed. The force measuring system is configured to determine the weight force of the goods being weighed. The scale according to the invention can be configured with any desired force transducers and force measuring systems. The scale according to the invention also comprises a corner load sensor for measuring tilting of the scale pan relative to the force transducer. Tilting of the scale pan occurs in particular when the center of gravity of the goods being weighed is not arranged centrally on the scale pan or is not arranged to align with the force transmission axis of the force transducer. This is also designated as corner load. The corner load produces a torque acting on the scale pan which is then transmitted to the force transducer. This torque results in tilting of the scale pan, wherein the tilting is limited and determined by the play in the components supporting the scale pan or by the elasticity of elastic components which support the scale pan. It is of no direct significance to the invention how the components for supporting the scale pan are configured.

According to the invention, the corner load sensor comprises a light beam source for emitting a first light beam and preferably a second light beam. The first light beam and the second light beam are directed to a reflecting surface preferably on the underside of an arrangement comprising the scale pan. In a straight-forward case, this arrangement involves the underside of the scale pan, which is configured such that the two light beams are reflected in a directed manner. However, this can also involve an underside of a lower pan which is rigidly connected to the scale pan. In any event, the two light beams should be directed at an underside which follows the movements, and particularly the tilting movements, of the scale pan. The first light beam and the second light beam are each inclined relative to the reflecting surface of the untilted scale pan, i.e., they are each inclined relative to a perpendicular constructed on the reflecting surface of the untilted scale pan.

The corner load sensor of the scale according to the invention also comprises a first optical sensor for measuring the first light beam reflected by the reflecting surface. If no corner load is present, a predetermined proportion of the reflected first light beam is directed to the first optical sensor. For example, the corner load sensor can be configured such that in the absence of a corner load, half of the first light beam reflected by the reflecting surface falls on the first optical sensor, whereas the other half of the first reflected light beam falls beside the first optical sensor. In the same way, the corner load sensor of the scale according to the preferred embodiment of invention comprises a second optical sensor, onto which, in the absence of a corner load, a predetermined proportion of the second light beam reflected by the reflecting surface is directed.

The light quantity measured with the first optical sensor and the light quantity measured with the second optical sensor enable a conclusion to be drawn about the existence and extent of a tilt of the scale pan relative to the force transducer. If no tilt exists, the predetermined proportions of the first light beam and of the second light beam are directed to the first optical sensor and to the second optical sensor. If the scale pan tilts, then the reflecting surface also tilts, so that the directions of the reflected first light beam and of the second reflected light beam change. This has the result that the proportion of the reflected first light beam which is directed toward the first optical sensor is greater or smaller than otherwise. The same applies for the reflected second light beam, i.e., the proportion of the reflected second light beam which is directed toward the second optical sensor also becomes greater or smaller. As a result, the proportions of the reflected light beams that fall on the two optical sensors change, and thus also the light quantities measured by the two optical sensors change dependent on the tilt of the scale pan.

The corner load sensor of the scale according to the invention therefore preferably comprises an evaluation unit configured to determine the tilt of the scale pan dependent on the light quantity measured with the first optical sensor and, optionally, on the light quantity measured with the second optical sensor.

An important advantage of the scale according to the invention lies therein that no special sensor or other mechanism for force transfer-free connection is needed on the scale pan or the arrangement including the scale pan. Only a reflecting surface is required there. The accuracy of the corner load sensor of the scale according to the invention exceeds that of typical distance sensors. Even very slight tilting of the scale pan leads to directional changes in the two light beams, causing distinctly measurable changes in the light quantities detected by the two optical sensors. Existing scales can be retrofitted with the described corner load sensor, so that a configuration according to the invention can be implemented quite cost-effectively.

The light source is preferably situated centrally beneath the untilted scale pan, i.e., beneath the center of gravity of the scale pan. The light source is therefore situated on a perpendicular to the reflecting surface of the untilted scale pan and through the center of gravity of the scale pan. In the case of a scale pan with a rectangular or circular plan outline, the source of the light beam is therefore situated beneath the central point of the rectangle or circle.

The first light beam and the second light beam are preferably configured identically with regard to their geometric and photometric properties. Consequently, the dimensions of the beams and the spectra and intensity of the two beams are also identical (here and throughout the present application, the terms "identical" and "same" encompass differences that fall below given tolerance limits). These two light beams have the same angle relative to a perpendicular to the reflecting surface of the untilted scale pan and lie in one plane with the perpendicular. Consequently, the light beam source radiates two identical light beams symmetrically toward the reflecting surface of the underside of the scale pan or of an arrangement that encompasses the scale pan. Also preferably situated in the plane including the light beams is a horizontal axis of symmetry of the scale pan. This horizontal axis of symmetry can be, for example, the central longitudinal axis of a scale pan which has a rectangular plan outline.

The first optical sensor and the second optical sensor preferably each have the form of an annular sector which is oriented parallel to the reflecting surface of the untilted scale pan. The central point of the annulus, the sectors of which form the annular sector forms of the optical sensors, lies on a perpendicular constructed on the reflecting surface of the untilted scale pan and passes through the light source.

In a preferred embodiment of a scale fashioned according to the invention, measurement of the tilt is possible in two directions. For this purpose, a third and fourth light beam are emitted from the light source toward the reflecting surface. The third and fourth light beams are inclined relative to the perpendicular of the reflecting surface of the untilted scale pan and each have the same angle relative to this perpendicular. In addition, they lie, together with this perpendicular, in one plane which is perpendicular to the plane in which the first light beam and the second light beam lie. In the absence of a corner load, a predetermined proportion of the third light beam reflected by the reflecting surface is directed toward a third optical sensor. In a similar manner, in the absence of a corner load, a predetermined proportion of the fourth light beam reflected by the reflecting surface is directed toward a fourth optical sensor. Consequently, the extent of tilt about a first rotation axis of the scale pan and tilt about a rotation axis perpendicular to the first rotation axis can be measured. A scale according to the invention can also be configured with a light beam source which emits further light beams which, after being reflected by the reflecting surface, are directed toward further optical sensors. As a result, the accuracy when determining the tilting movements can be increased, or further tilting axes can be taken into account. It is also possible for just two optical sensors to be arranged on axes oriented perpendicular to one another if the scale pan is regarded as being rigid and if it can be assumed that the measuring results from sensors which are arranged diametrically opposed to one another about a measuring axis are essentially mirror-images of one another.

The light beam source is preferably formed by a single light source. In this embodiment of the scale according to the invention, for example, aging-related changes in the light intensity of the light beam source do not have to be compensated for by renewed adjustment. The plurality of light beams emitted by the light beam source alter equally due to the aging of the light beam source, so that the lessening of the light intensity can remain unconsidered in a comparison of the reflected beams. However, for particular embodiments of the inventive scale, it can be advantageous to configure the light beam source with a plurality of light beam sources, for example, if the individual light beams are to be emitted from different positions.

The light beam source preferably emits a light cone which consists of the first light beam and the second light beam, each as individual light beams. The individual light beams with the two light beams can be provided, for example, at the periphery of the light cone. The light cone can be formed by a plurality of individual light beams, wherein the first light beam and the second light beam are each formed by one of the many individual light beams.

The light beam can also be formed by a homogeneously configured light cone, so that the individual light beams forming the first light beam and the second light beam each represent a section of the light cone. In various embodiments of the scales according to the invention, which make use of a third light beam and a fourth light beam or further light beams, these light beams are also formed by individual light beams of the homogeneous light cone. The individual light beams or sections of the light cone which do not form a light beam according to the invention remain unused in the scale according to the invention. This light cone form offers the advantage that a rotation of the reflecting surface does not produce a falsification of the measuring result, since it does not evoke any change in the light intensity produced at the respective sensors.

In a simple embodiment, the light cone is entirely filled with light. The reflecting surface has the form of an annulus arranged concentrically with the light cone. Thus, the reflecting surface reflects, in particular, the first light beam and the second light beam, whereas most of the other portions of the light cone are not reflected. Furthermore, a third light beam and a fourth light beam are reflected according to the above described embodiment by the annular reflecting surface.

In a particularly preferred embodiment of the scale according to the invention, the light cone is configured hollow-cone shaped. Consequently, cross-sections perpendicular to the beam direction have the form of an annulus. A hollow light cone can be formed, for example, with an annular lens and/or an annular aperture in the light beam source. This embodiment has the advantage that the light from the single light source is concentrated, particularly in the regions of the first light beam and the second light beam and possibly the third and fourth light beams.

The light source is preferably formed by a vertical cavity surface emitting laser (VCSEL). Semiconductor lasers of this type emit the light perpendicularly to the plane of the semiconductor chip and are therefore suitable for the emission of light which is formed via an annular lens into a hollow light cone. The VCSEL can be arranged, together with the first optical sensor and the second optical sensor, on a single silicon substrate. The first optical sensor and the second optical sensor are each preferably configured as photodiodes. The two photodiodes are arranged with rotational symmetry in relation to the VCSEL. In this embodiment, the entire corner load sensor, apart from the evaluating unit, is concentrated on a single silicon chip, so that said sensor constitutes a compact component.

In a further preferred embodiment of the scale according to the invention, the predetermined proportion of the reflected first light beam which, in the absence of a corner load, is directed toward the first optical sensor and the predetermined proportion of the reflected second light beam which, in the absence of a corner load, is directed to the second optical sensor, are identical with regard to their geometric and photometric properties. This feature exists, for example, when the arrangement consisting of the light beam source with the two light beams emitted therefrom and the two optical sensors is embodied entirely symmetrically. If a corner load is applied, the scale pan and the reflecting surface tilt so that the two reflected light beams are each either moved toward the respective optical sensor or away from the respective optical sensor. Consequently, either the proportion of the first light beam which is reflected toward the first optical sensor is reduced, while the proportion of the second light beam which is reflected toward the second optical sensor is increased, or it comes about that the proportion of the first light beam reflected toward the first optical sensor is increased, while the proportion of the second light beam reflected toward the second optical sensor is reduced. Essentially, therefore, the quantity of light measured with one of the two optical sensors becomes greater, while the quantity of light measured with the other of the two optical sensors becomes smaller. Consequently, even at very small tilts, there is a large difference between the light quantities measured with the two optical sensors.

In one embodiment of the scale according to the invention, the proportion of the reflected light beam which, in the absence of a corner load, is not directed toward the first optical sensor, is directed toward a region between the first optical sensor and the light beam source. In the same way, the proportion of the reflected second light beam which, in the absence of a corner load, is not directed toward the second optical sensor, is directed toward a region between the second optical sensor and the light beam source. Consequently, in the absence of a corner load, the two optical sensors are illuminated in their inner edge regions by the two light beams, that is, the edge regions facing toward the light beam source. Alternatively, the scales according to the invention can be configured so that the outer regions of the two optical sensors are illuminated by the two light beams.

The problem set out above is further addressed with a method for measuring tilt caused by a corner load on a scale pan of a top-pan scale relative to a force transducer supporting the scale pan. In this method, a first light beam and a second light beam are directed to a reflecting surface on an underside of an arrangement comprising the scale pan. The first light beam and the second light beam are both tilted relative to a perpendicular of the reflecting surface of the untilted scale pan. Using a first optical sensor, the proportion of the first light beam reflected by the reflecting surface which falls on the first optical sensor is measured. In the same way, using a second optical sensor, the proportion of the second light beam reflected by the reflecting surface which falls on the second optical sensor is measured. The light quantity measured with the first optical sensor and that measured with the second optical sensor are compared with one another. The result of this comparison permits conclusions to be drawn regarding the possible tilting of the scale pan and thus also regarding a corner load. If no corner load is present, no tilting of the scale pan takes place and the quantity of light measured with the first optical sensor has a predetermined relation to the quantity of light measured with the second optical sensor, for example, one of equality. If the goods being weighed are not positioned centrally on the scale pan, a corner load exists and tilting of the scale pan takes place. The tilting of the scale pan also leads to tilting of the reflecting surface so that both reflected light beams are changed in their beam direction. In this way, the proportions of the two reflected light beams that fall upon the two optical sensors change, so that the light quantities measured with the two optical sensors change in relation to one another. This change is a measure of the tilting of the scale pan. The detected tilting of the scale pan should be taken into account by the force measuring system, in order to correct the weight force detected by the sensors of the force measuring system. In this way, extremely small weight forces can be measured with a very high level of accuracy.

In a preferred embodiment of the method according to the invention, a third light beam and a fourth light beam are also directed toward the reflecting surface. The third light beam and the fourth light beam are inclined relative to a perpendicular of the reflecting surface of the untilted scale pan and both lie, together with this perpendicular, in a plane which lies perpendicular to a plane in which the first light beam and the second light beam lie. With the aid of a third optical sensor, the proportion of the third light beam reflected by the reflecting surface which falls on the third optical sensor is measured. Similarly, with the aid of a fourth optical sensor, the proportion of the fourth light beam reflected by the reflecting surface which falls on the fourth optical sensor is measured. The quantity of light measured with the third optical sensor and the quantity of light measured with the fourth optical sensor are compared. The result of the comparison between the light quantity measured with the first optical sensor and the light quantity measured with the second optical sensor and the result of the comparison between the light quantity measured with the third optical sensor with the light quantity measured with the fourth optical sensor enable conclusions to be drawn regarding the possible tilt of the scale pan about a first rotation axis and about a second rotation axis perpendicular thereto. Thus the influence of tilting of the scale pan caused by a corner load on the force measuring system can be taken into account more accurately, which further increases the measuring accuracy of the scale.

BRIEF DESCRIPTION OF THE DRAWINGS

Further advantages, details and developments of the present invention are disclosed in the following description of various preferred embodiments, making reference to the drawings, in which.

DETAILED DESCRIPTION OF VARIOUS PREFERRED EMBODIMENTS

Figure 1:
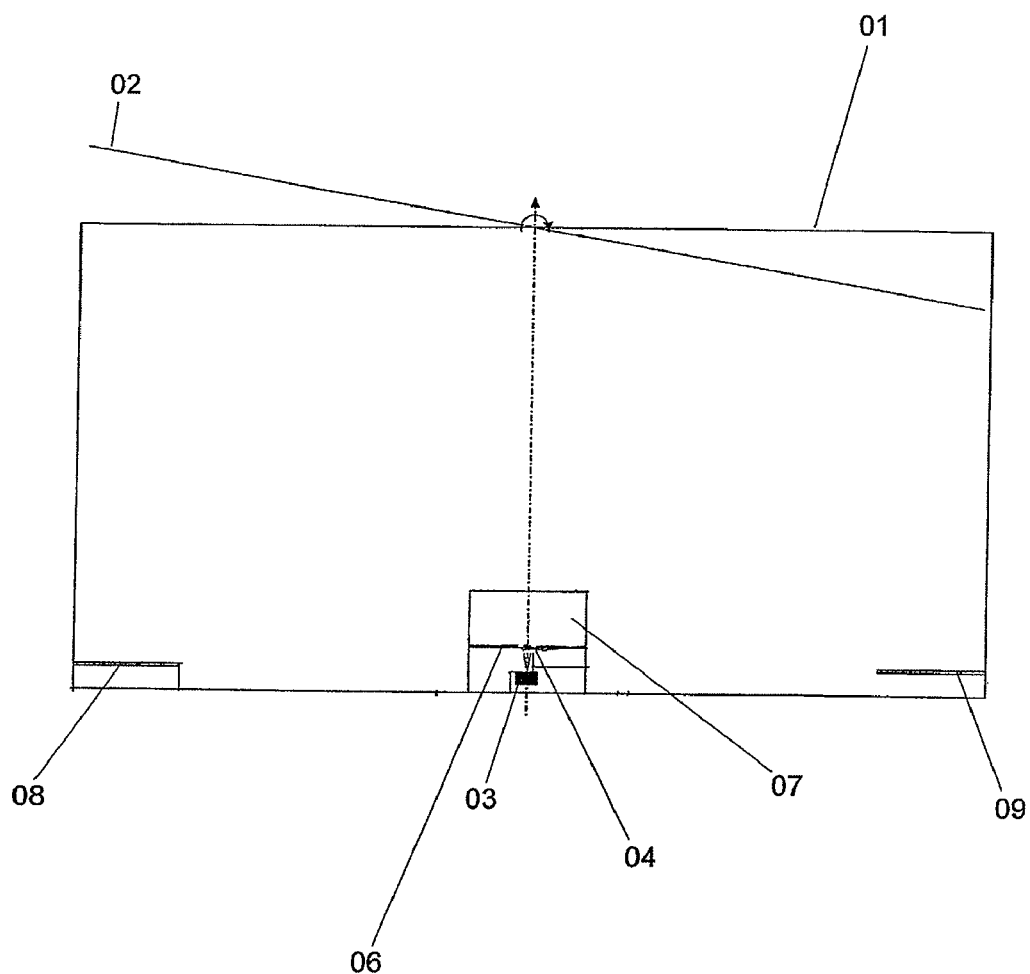
FIG. 1 is a schematic depicting the principle underlying a first preferred embodiment of a scale according to the invention.

FIG. 1 illustrates the principle of a first preferred embodiment of a top-pan scale according to the invention. The top-pan scale according to the invention comprises a scale pan 01 which is symbolized by a horizontal line. It is unimportant for the principle according to the invention whether this relates to the scale pan or a lower pan. The scale pan is also symbolically shown in a tilted condition 02. Situated beneath the central point of the scale pan 01 is a VCSEL (Vertical Cavity Surface Emitting Laser) 03, which is oriented in the direction of the central point of the scale pan 01. The light from the VCSEL 03 initially passes through an annular lens 04 and through an annular aperture 06 so that the light from the VCSEL 03 is formed into a hollow cone. The light from the VCSEL 03 also passes through a Borofloat glass 07, which is made from borosilicate glass. The light emitted from the VCSEL 03 then falls on the underside of the scale pan 01, 02 which is configured to be highly reflective, so that the light is reflected directionally. The reflected light falls at least partially onto a first photodiode 08 and onto a second photodiode 09, which are both arranged in a common plane with the VCSEL 03 and are arranged equally spaced therefrom.

Figure 2:
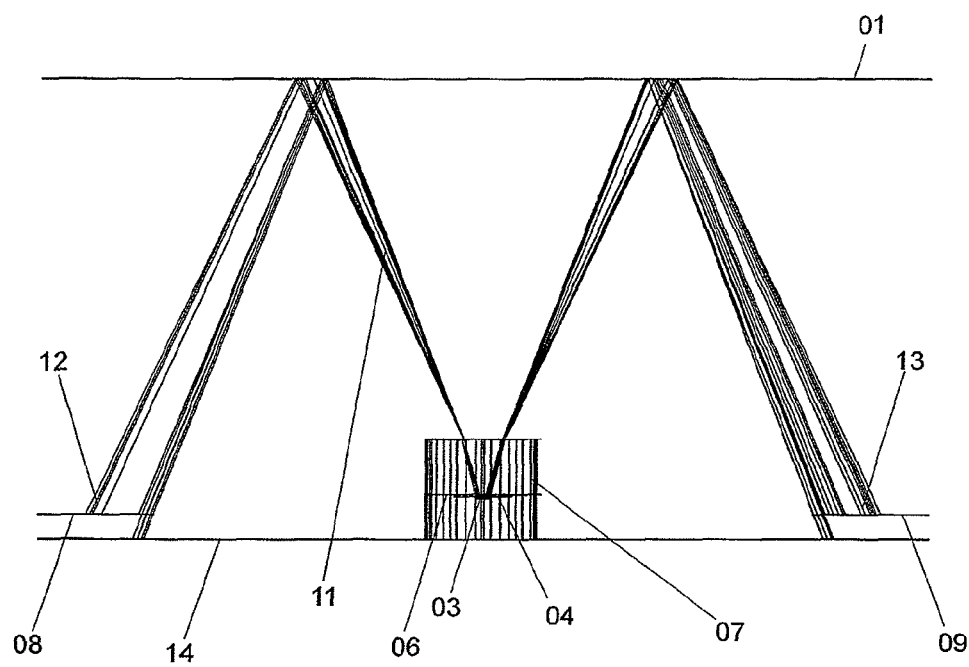
FIG. 2 is a ray-path drawing for the scale of FIG. 1 with the scale pan untilted.

FIG. 2 shows a ray-path for the top-pan scale of FIG. 1 according to the invention when the scale pan 01 is in an untilted condition. The light from the VCSEL 03 formed by the annular lens 04 and the annular aperture 06 (shown in FIG. 1) emerges as a hollow light cone 11 from the Borofloat glass 07. In the sectional representation, the light cone 11 is illustrated by two ray bundles. The light cone 11 is reflected by the reflective underside of the scale pan 01 and retains the hollow conical form. A cross-section through the light cone 11 parallel to the scale pan 01 has the form of an annulus. Diametrically opposing sections of the annular form of the cross-section of the light cone 11 fall on the first photodiode 08 and the second photodiode 09, wherein only an outer portion 12 of the section of the annular form is directed onto the first photodiode 08. In a similar manner, only an outer portion 13 of the other section of the annular form is directed onto the second photodiode 09. The other portions of the sections from the annular form of the cross-section of the light cone 11 do not fall on the first photodiode 08 or the second photodiode 09, but are directed onto a base surface 14. The portion 12 of the light cone 11 which is directed onto the first photodiode 08 and the portion 13 of the light cone 11 which is directed onto the second photodiode 09 are identical with regard to the geometric and photometric properties. This is the case since the arrangement comprising the VCSEL 03, the scale pan 01 and the two photodiodes 08, 09 is arranged symmetrically about a straight line which extends through the VCSEL 03 and the center point of the scale pan 01. In particular, the scale pan 01 is untilted in the condition shown, i.e., the scale pan is oriented parallel to the plane in which the two photodiodes 08, 09 lie.

Figure 3:
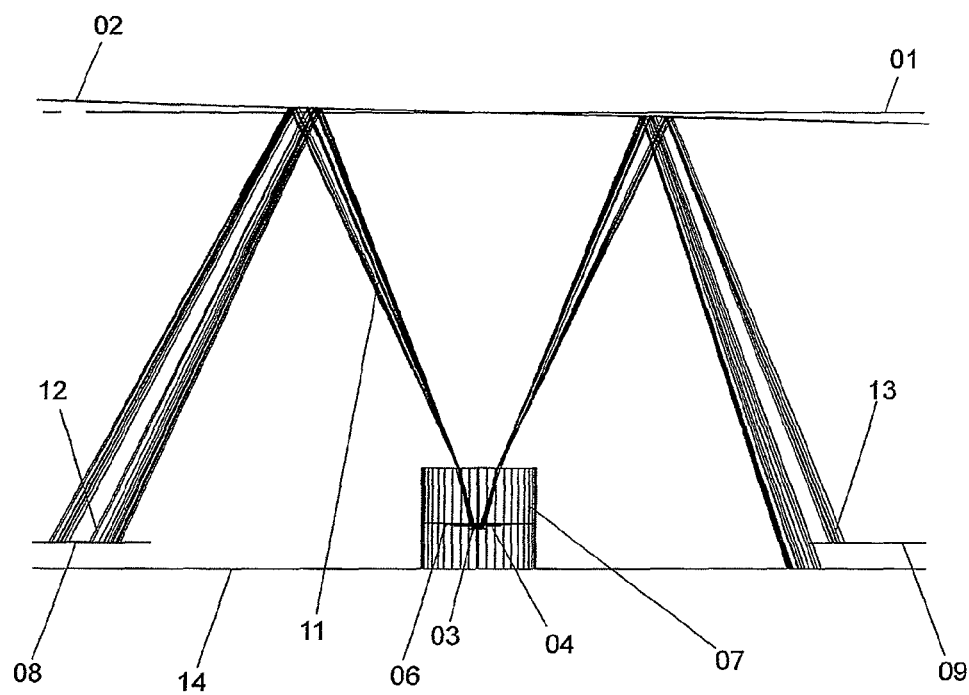
FIG. 3 is a ray-path drawing for the scale of FIG. 1 with the scale pan tilted.

FIG. 3 shows a ray-path for the top-pan scale of FIG. 1 according to the invention with the scale pan 02 tilted. The untilted scale pan 01 is also shown for comparison. Due to the tilt of the scale pan 02, the light cone 11 is not reflected symmetrically from the underside of the tilted scale pan 02. Consequently, the proportions 12, 13 of the annular form of the cross-section of the light cone 11 which fall upon the first photodiode 08 and the second photodiode 09 change. The proportion 12 of the annular form of the light cone 11 that is directed onto the first photodiode 08 is increased as compared with the untilted condition. In the tilted condition of the scale pan 02 shown, the entire proportion 12 of the annular form of the cross-section of the light cone 11 is directed onto the first photodiode 08. However, the proportion 13 of the section of the annular form of the cross-section of the light cone 11 which is directed onto the second photodiode 09 is reduced.

Only a small proportion of the section of the annular form of the cross-section of the light cone 11 falls onto the second photodiode 09.

Figure 4:
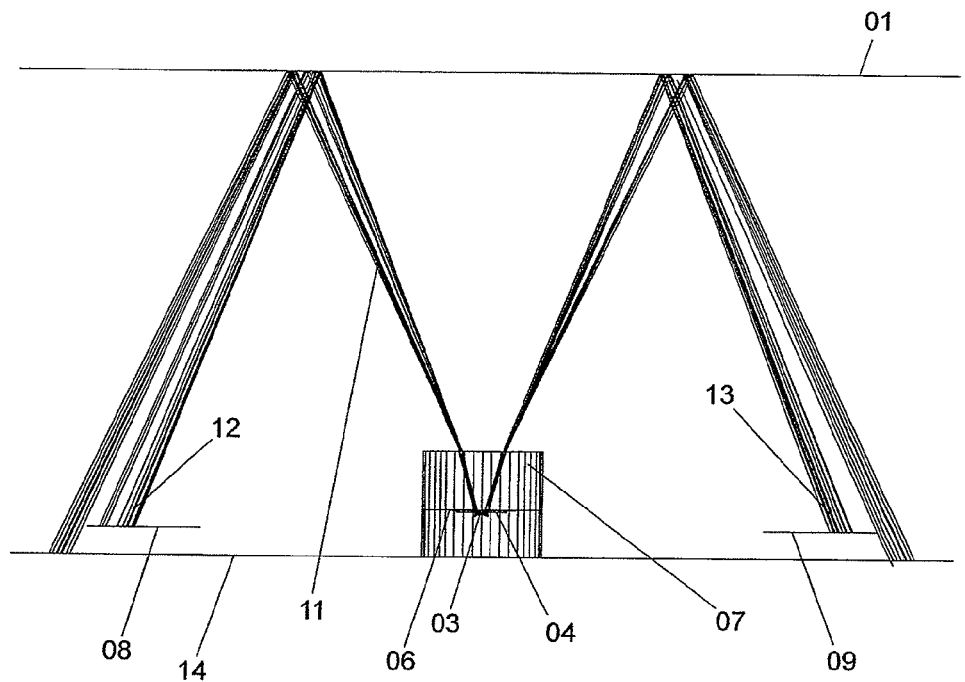
FIG. 4 is a ray-path drawing for a further preferred embodiment of the top-pan scale according to the invention.

FIG. 4 shows a ray-path for a further preferred embodiment of the top-pan scale according to the invention, wherein, as compared with the embodiment shown in FIG. 1, the sole difference is that the distance from the first photodiode 08 to the VCSEL 03 and the distance from the second photodiode 09 to the VCSEL 03 are reduced. This has the result that the outer portions of the sections of the annular form of the cross-section of the light cone 11 following reflection by the untilted scale pan 01 do not fall on the first photodiode 08 and on the second photodiode 09, but rather on the base surface 14. Consequently, the inner proportions 12, 13 of the sections of the annular form of the cross-section of the light cone 11 are directed onto the first photodiode 08 and the second photodiode 09. Just as in the embodiment of the scale according to the invention shown in FIG. 1, these two proportions 12, 13 are equal-sized with the scale pan 01 untilted. In this embodiment, the associated characteristic curve of light distribution dependent on the tilt of the scale pan 01, 02 is steeper so that this embodiment can be configured more compactly than the embodiment shown in FIG. 1.

Figure 5:
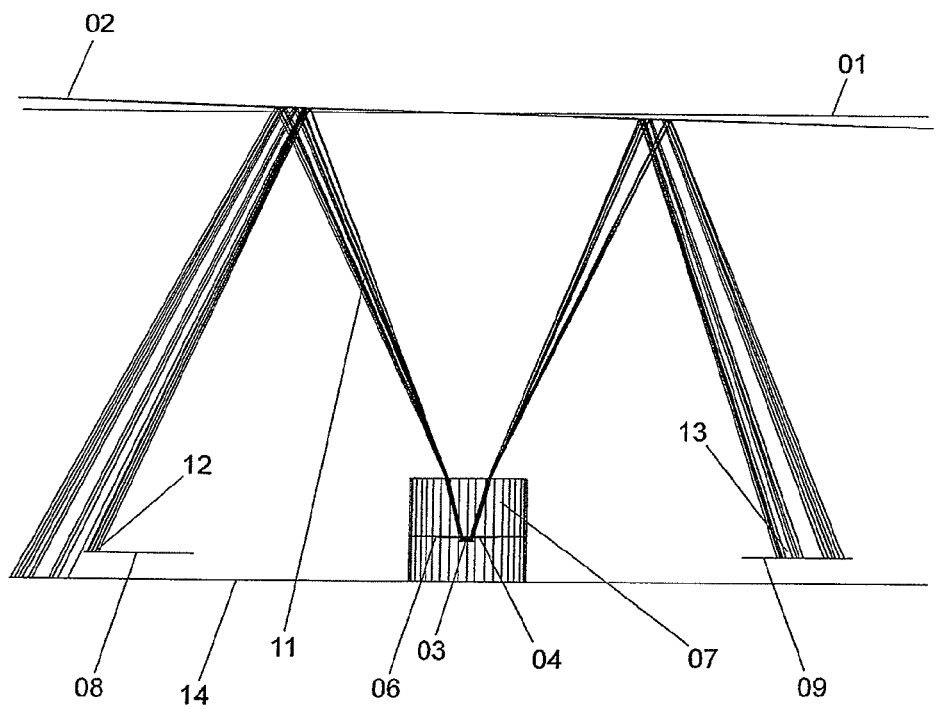
FIG. 5 is a ray-path drawing for the embodiment of FIG. 4 with the scale pan tilted.

FIG. 5 shows a ray-path for the embodiment shown in FIG. 4 when the light cone 11 is reflected from the tilted scale pan 02. For comparison, the untilted scale pan 01 is indicated again. Contrary to the ray-path shown in FIG. 3, the proportion 12 of the annular form of the cross-section of the light cone 11 that is directed to the first photodiode 08 is reduced, whereas the proportion 13 of the section of the annular form of the cross-section of the light cone 11 which is directed to the second photodiode 09 is increased.

Figure 6:
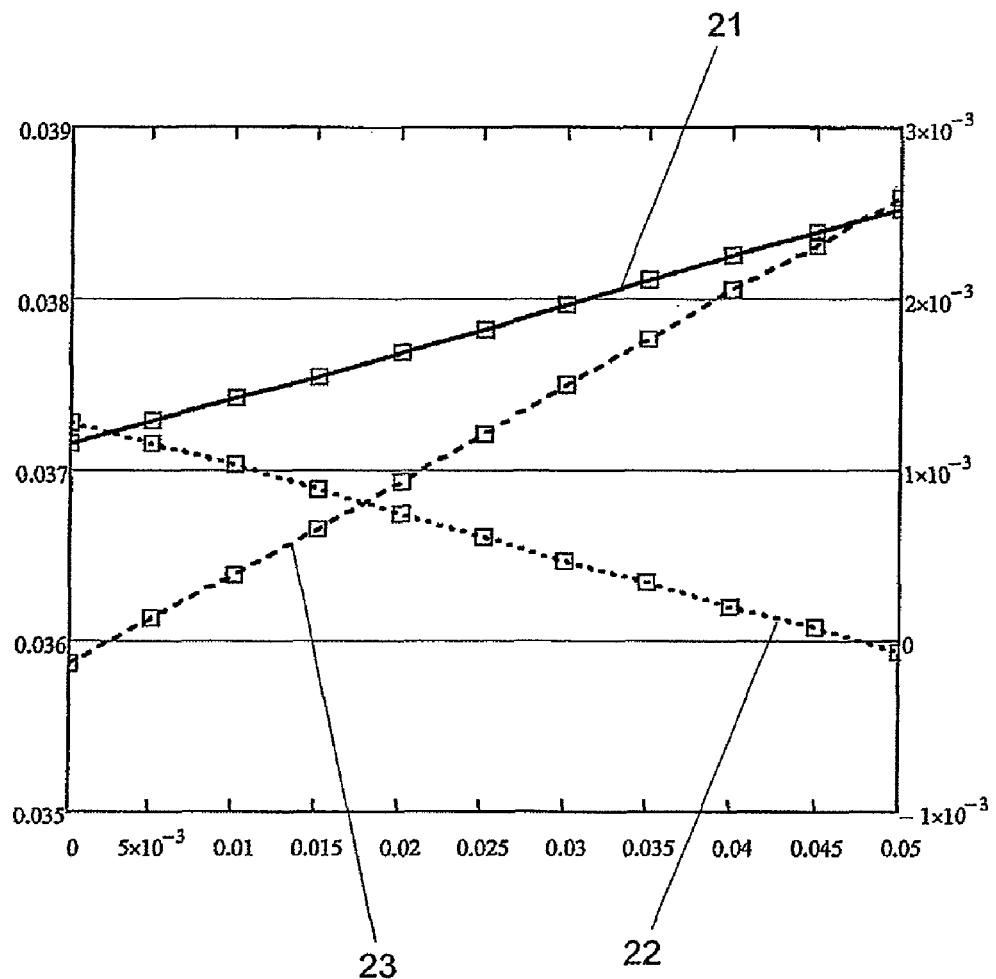
FIG. 6 is a graphical representation of the change in optical intensity during tilting of the scale pan.

FIG. 6 shows a graph to illustrate the change in the light intensity measured by the two photodiodes 08, 09 (shown in FIG. 1) dependent on the tilt of the scale pan 01, 02. The x-axis of the graph represents the angle of tilt of the scale pan 01, 02 in degrees. The y-axis of the graph shows the measured light intensity in mW. A first line 21 shows the measured light intensity from the first photodiode 08. A second line 22 shows the measured light intensity of the second photodiode 09. If the scale pan 01 is not tilted, i.e., the angle is 0, the light intensities 21, 22 measured by the two photodiodes 08, 09 are approximately equal and differ only slightly due to noise. If the scale pan 02 tilts, the light intensity 21 measured with the first photodiode 08 increases, while the light intensity 22 measured with the second photodiode 09 decreases by the same amount. A third line 23 represents the difference between the light intensity 21 measured with the first photodiode 08 and the light intensity 22 measured with the second photodiode 09. It is clear that this difference line 23 increases linearly with the angle of tilt of the scale pan 02, so that a very accurate measurement of the angle of tilt is possible with the arrangement according to the invention. The difference signal changes to an extent that can be readily evaluated with conventional electronic units.

Figure 7:
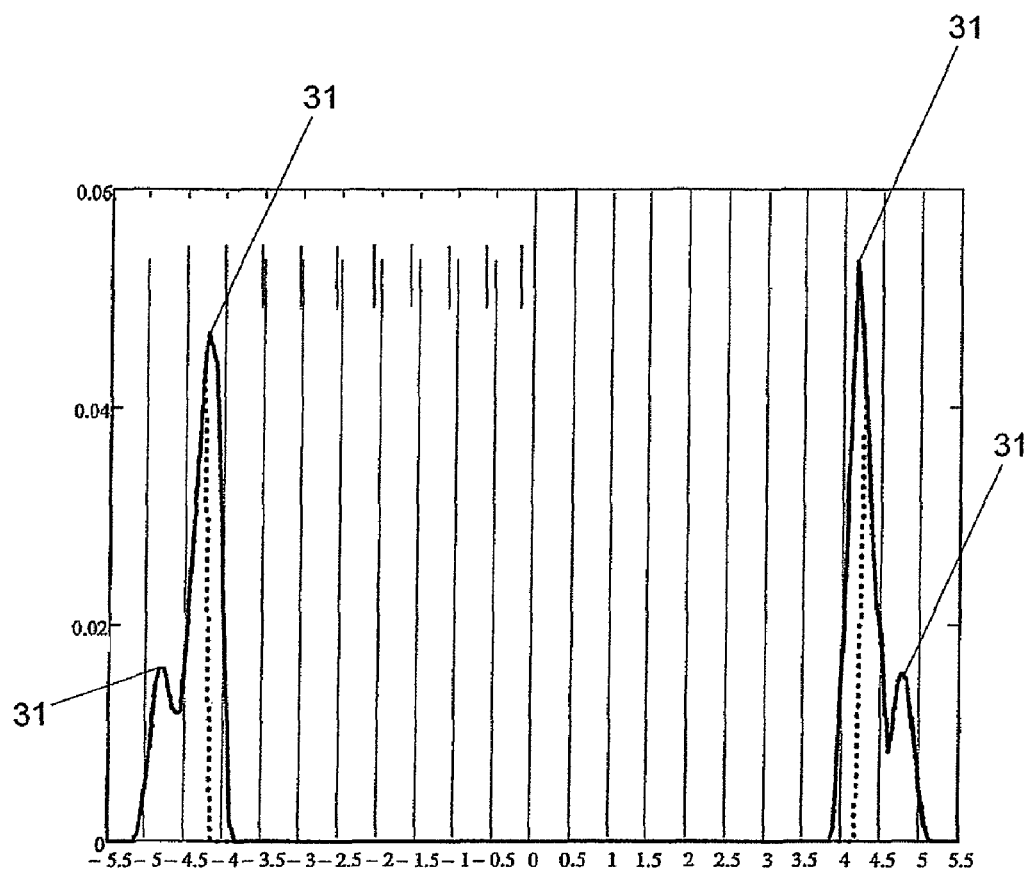
FIG. 7 is a graphical representation of the beam distributions for the scale shown in FIG. 2.

FIG. 7 shows a graph to illustrate the beam distribution of the light cone 11 (shown in FIG. 2) in a plane parallel to the untilted scale pan 01. The x-axis of the graph represents the distance from the VCSEL 03 (shown in FIG. 1) in mm. The y-axis of the graph shows the light power density in mW/m$^2$. Given an ideal light distribution within the hollow form of the light cone 11, the signal shape of the light power density against distance would be represented by two rectangular signals. However, as shown, the actual distribution of the light power density within the hollow form of the light cone 11 is represented by two signal peaks 31.

Figure 8:
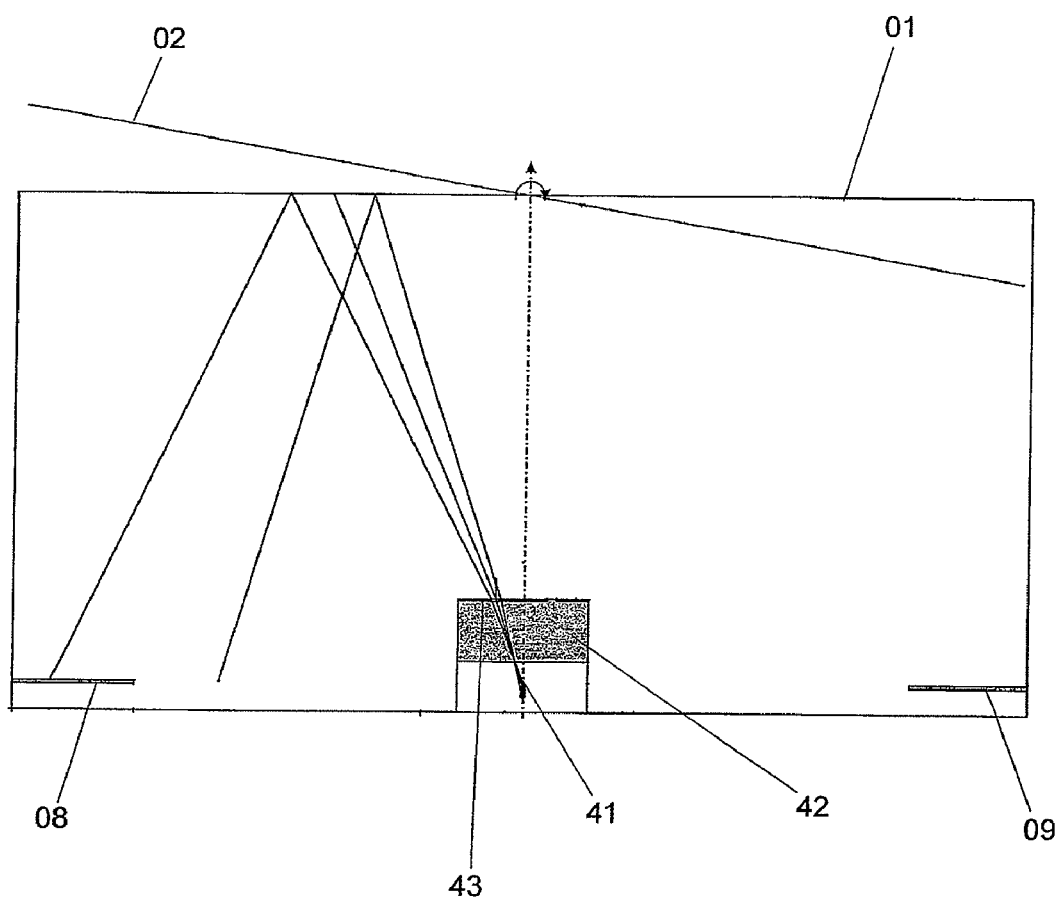
FIG. 8 is a representation of the principle of a further preferred embodiment of the scale according to the invention.

FIG. 8 shows a representation of the principle of a further preferred embodiment of the top-pan scale according to the invention. This embodiment of the scale according to the invention comprises an LED 41 as the light source, the light from which initially passes through a Borofloat glass 42 and then through an annular aperture 43. In a similar manner to the embodiment of FIG. 1, the embodiment of the scale according to the invention shown here comprises the scale pan 01 and the two photodiodes 08, 09. The diameter of the emission region of the LED 41 is 50 µm.

Figure 9:
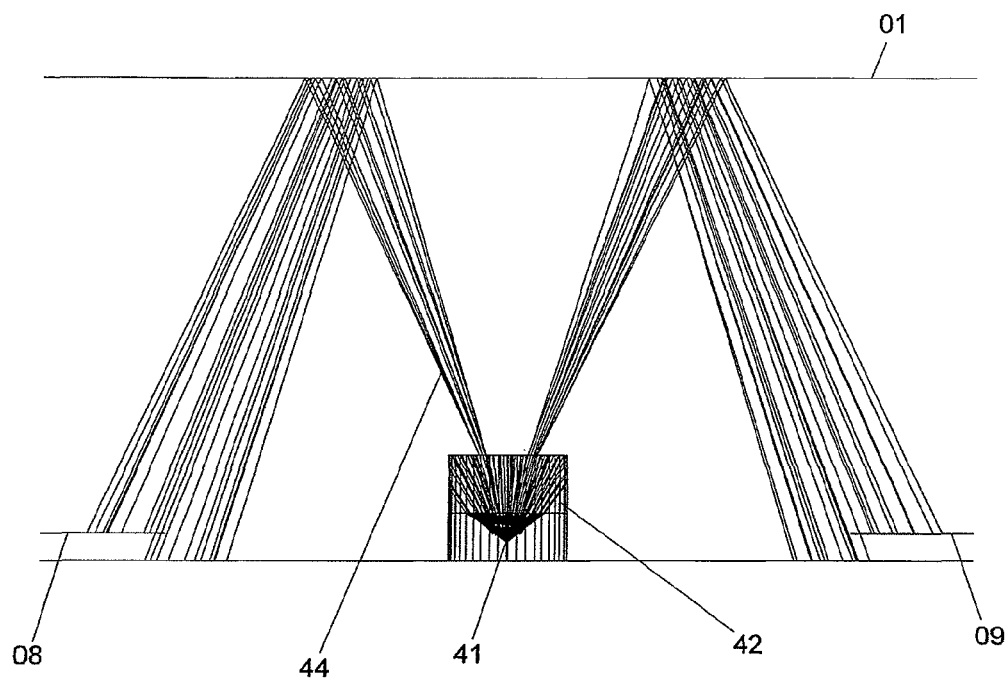
FIG. 9 is a ray-path drawing for the scale of FIG. 8 with the scale pan untilted.

FIG. 9 shows a ray-path for the embodiment of FIG. 8 of the scale according to the invention. It is apparent that the light from the LED 41 is initially formed by the annular aperture 43 into a hollow light cone 44. The light power distribution is therefore altered within the hollow form of the light cone 44 as compared with the light cone 11 shown in FIG. 2. In particular, the light intensity in a central region of the annular form of the cross-section of the light cone 44 is increased. In a similar manner as for the ray-path of FIG. 2, a portion of the sections of the annular form of the cross-section of the light cone 44 falls on the first photodiode 08 and on the second photodiode 09, once the light cone 44 has been reflected by the untilted scale pan 01.

Figure 10:
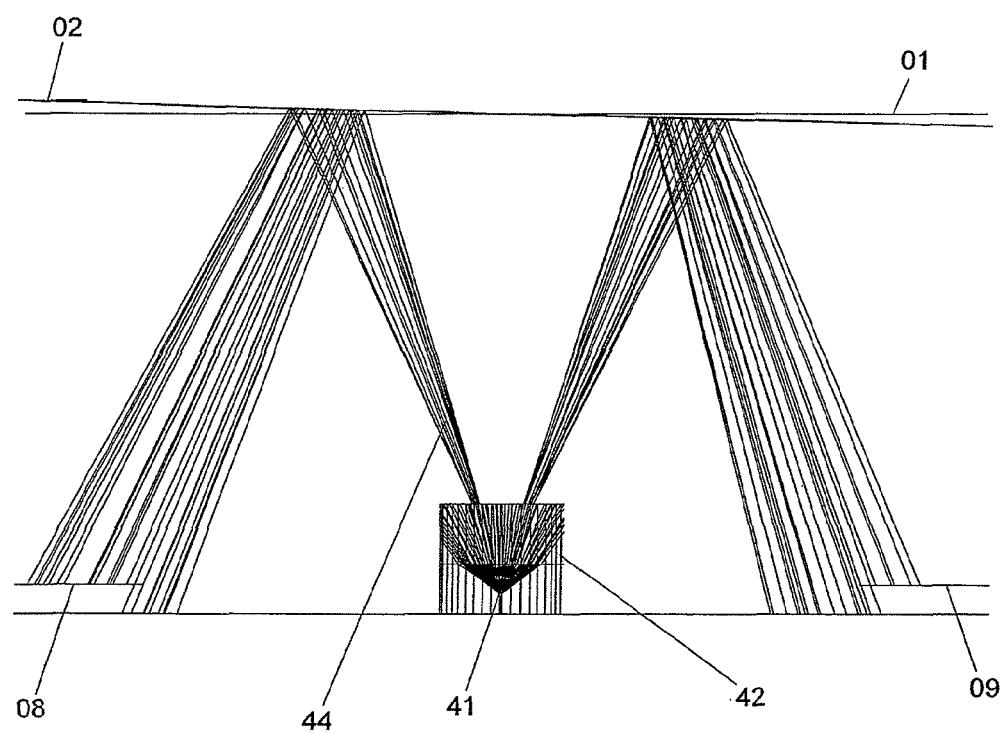
FIG. 10 is a ray-path drawing for the scale of FIG. 8 with the scale pan tilted.

FIG. 10 shows a ray-path for the embodiment shown in FIG. 8 of the scale according to the invention, wherein the light cone 44 is reflected by the tilted scale pan 02. In a similar manner as for the ray-path shown in FIG. 3, the proportion of the section of the annular form of the cross-section of the reflected light cone 44 which is directed to the first photodiode 08 is increased. The proportion of the section of the annular form of the cross-section of the light cone 44 which, after reflection from the tilted scale pan 02, is directed to the second photodiode 09, is reduced.

Figure 11:
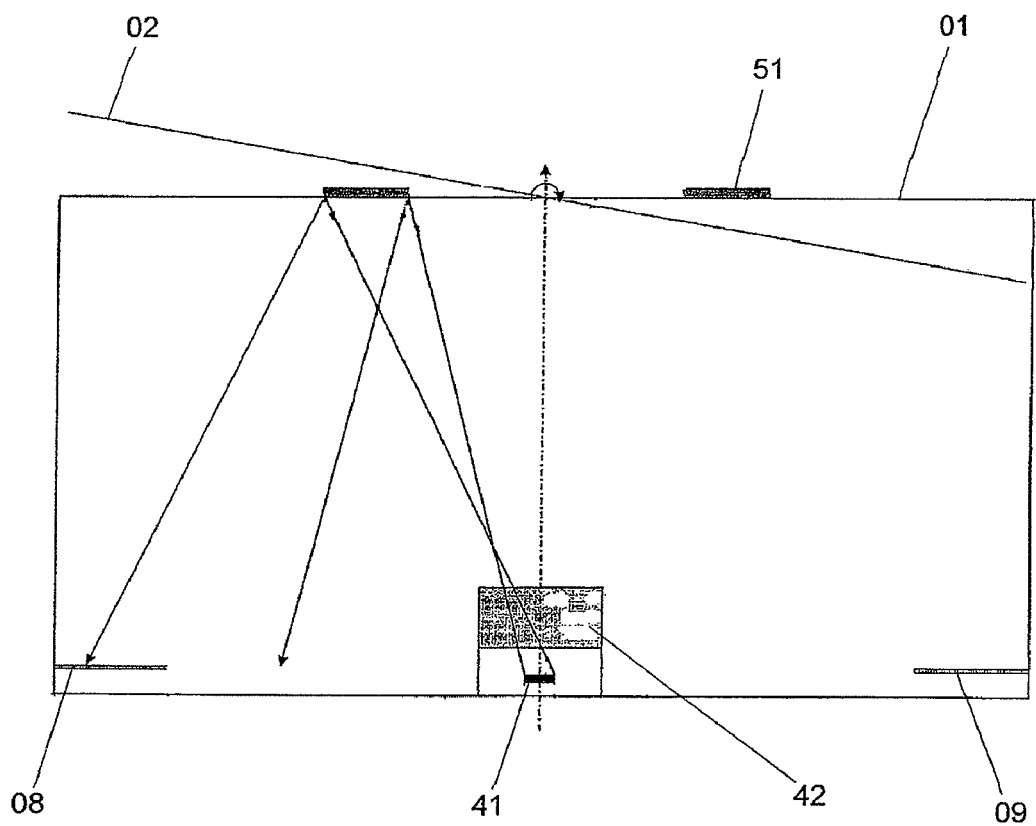
FIG. 11 is a further embodiment of the top-pan scale according to the invention.

FIG. 11 shows a particularly simple embodiment of the top-pan scale according to the invention. In this embodiment, contrary to the embodiment shown in FIG. 8, the light from the LED 41 is not formed by an annular aperture or an annular lens. The light from the LED 41 passes through the Borofloat glass 42 and falls on the underside of the scale pan 01. Contrary to the embodiments shown in FIG. 1 and FIG. 8 of the scale according to the invention, the underside of the scale pan 01 of this embodiment does not have a completely reflective surface. Rather, the underside of the scale pan 01 has an annular reflective surface 51. The LED 41 emits a light cone which does not have any particular shaping, so that this cone falls on the underside of the scale pan 01 as a completely filled cone. This completely filled light cone is reflected on the underside of the scale pan 01 only by the annular mirror surface 51, so that the reflected light cone is given a hollow conical form.

Figure 12:
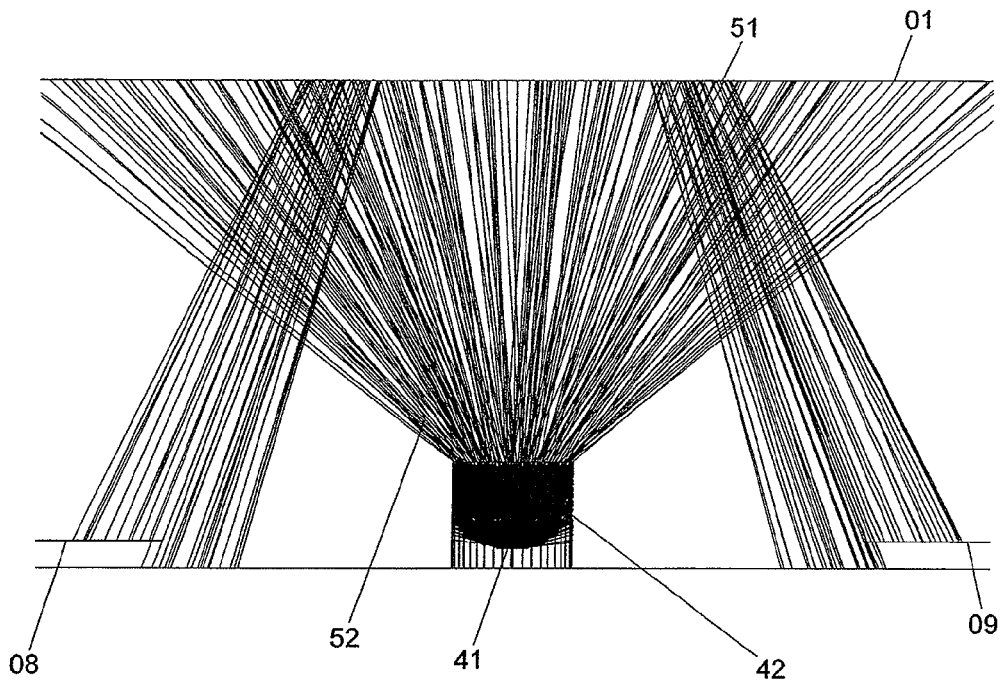
FIG. 12 is a ray-path for the scale of FIG. 11 with the scale pan untilted.

FIG. 12 shows a ray-path for the embodiment of the scale according to the invention shown in FIG. 11. The light from the LED 41 passes through the Borofloat glass 42, where the light emerges as a completely filled light cone 52. The completely filled light cone 52 is reflected only at the annular mirror surface 51, so that the reflected light cone 52 is given a hollow conical form. Similarly to the ray-path shown in FIG. 02, only portions of the sections of the annular form of the cross-section of the reflected light cone 52 are directed to the first photodiode 08 and the second photodiode 09, wherein these parts are equally large in an untilted position of the scale pan 01.

Figure 13:
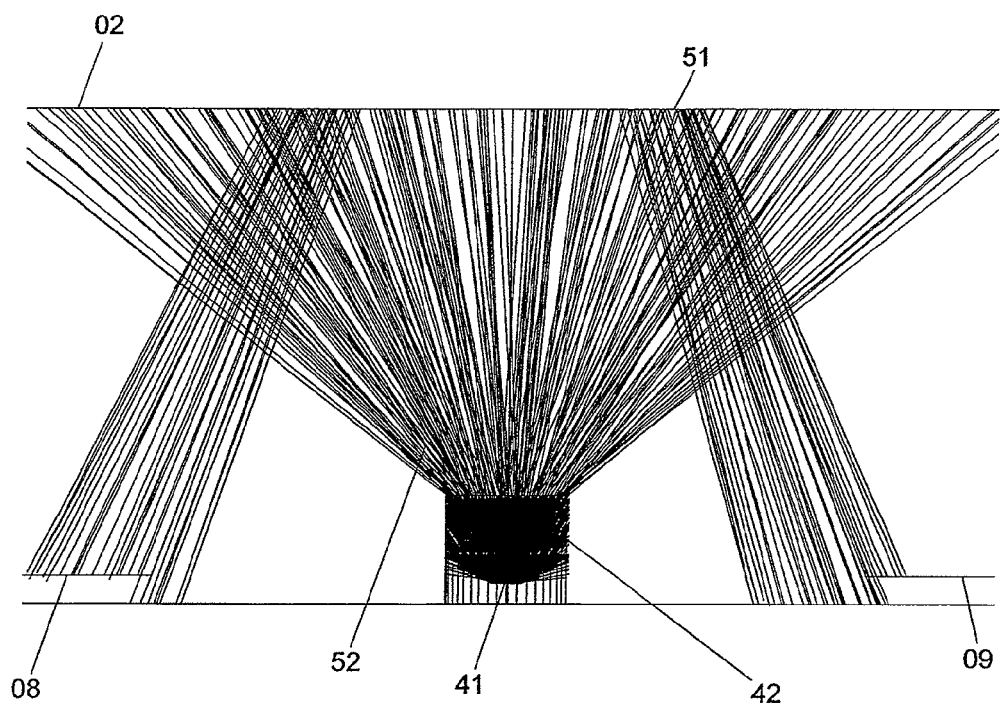
FIG. 13 is a ray-path for the scale of FIG. 11 with the scale pan tilted.

FIG. 13 shows a ray-path for the embodiment of FIG. 11 of the scale according to the invention when the scale pan 02 is tilted. In a similar manner as for the ray-path shown in FIG. 3, the proportion of the reflected light cone 52 which falls on the first photodiode 08 is enlarged, whereas the proportion of the light cone 52 which falls on the second photodiode 09 is reduced, relative, in each case, with respect to the light cone parts that strike the first photodiode 08 and the second photodiode in the untilted position of the scale pan 01 shown in FIG. 12.

The embodiment shown in FIG. 1 of the scale according to the invention has the advantage, as compared with the embodiment shown in FIGS. 8 and 11, that a very large proportion of the light emitted from the VCSEL 03 as the light source is formed into the hollow light cone 11. This is achieved, in particular, through the combination of the annular lens 04 and the annular aperture 06 (shown in FIG. 1).

Figure 14:
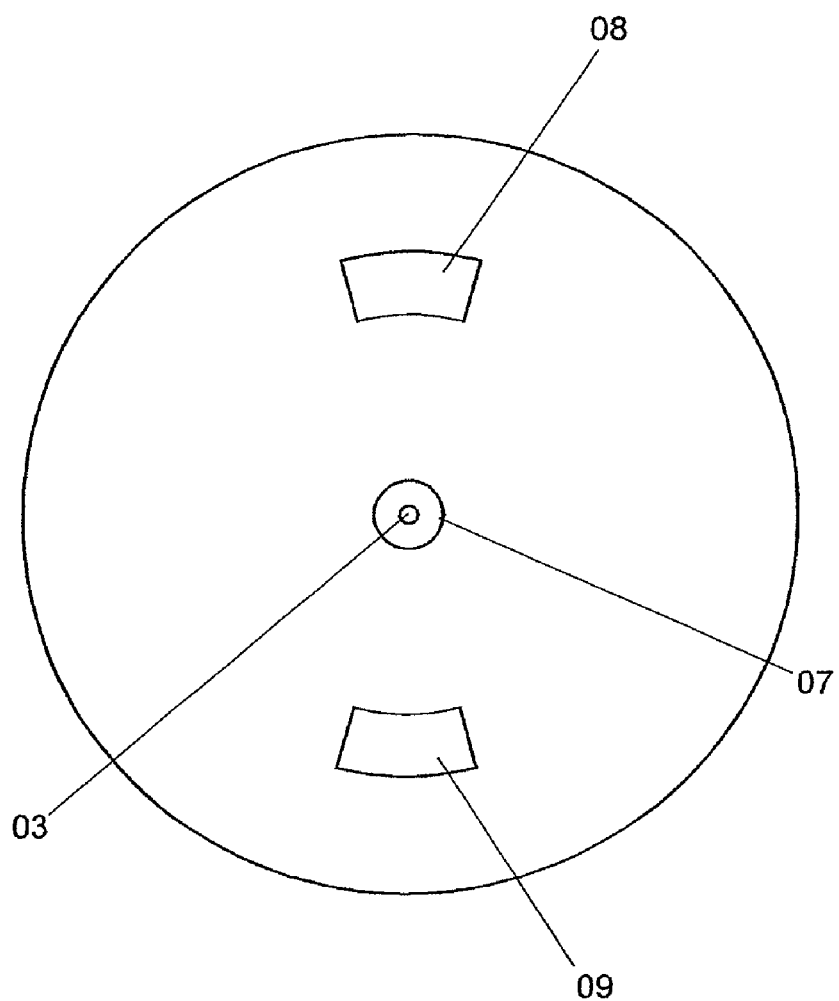
FIG. 14 is a view from above of the scale of FIG. 1.

FIG. 14 shows a view from above of the scale of FIG. 1 to illustrate the principle, but in this case the scale pan 01 is not shown. In the representation, particularly the cross-sectional form of the Borofloat glass 07, the first photodiode 08 and the second photodiode 09 are shown. The Borofloat glass 07 has a circular cross-section, wherein the VCSEL 03 is arranged in the center of this circular form. The first photodiode 08 and the second photodiode 09 have a similar cross-section, each resembling an annular sector. The annular sector forms are adapted to the annular cross-section of the reflected light cone 11 (shown in FIG. 2). The proportion 12 of the annular form of the light cone 11 which is directed to the first photodiode 08 changes due to the annular sector form of the first photodiode 08 in a linear manner if the scale pan 02 (shown in FIG. 3) is tilted. Similarly, the proportion 13 of the annular form of the light cone 11 which is directed to the second photodiode 09 changes in a linear manner due to the annular sector form of the second photodiode 09 when the scale pan 02 is tilted. The linear changes in the light quantities measured with the two photodiodes 08, 09 enable simple and accurate determination of the tilt of the scale pan 02.

Figure 15:
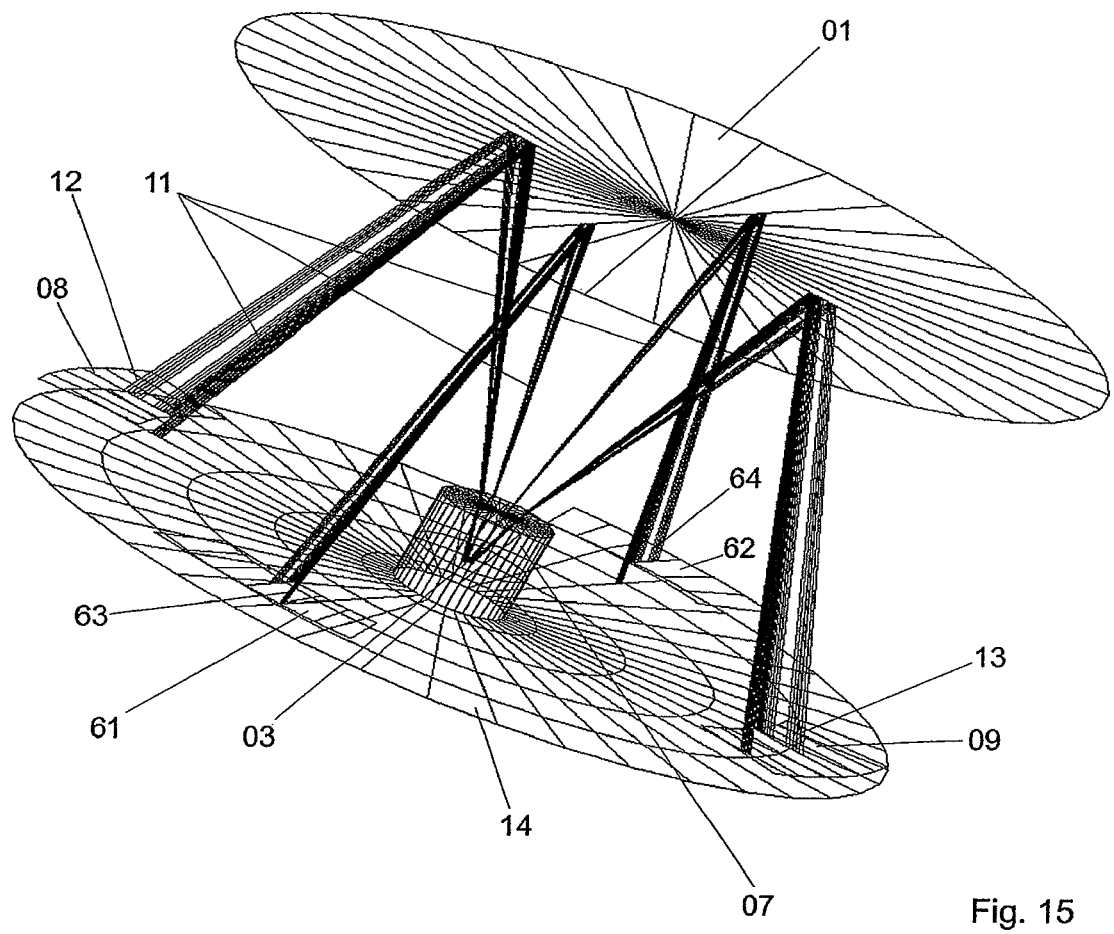
FIG. 15 is a schematic depicting the principle underlying a further embodiment of the scale according to the invention.

FIG. 15 shows a perspective representation showing the principle of a particular embodiment of the scale according to the invention, wherein measurement of the tilt in two directions is enabled. The ray-path for this scale is also shown. Cartesian grids have been used to show surfaces. Like the scale shown in FIG. 1, the scale illustrated in FIG. 15 also includes the untilted scale pan 01, the VCSEL 03, the Borofloat glass 07, the annular aperture 06 (not shown), the annular lens 04 (not shown), the first photodiode 08 and the second photodiode 09. The scale also has a third photodiode 61 and a fourth photodiode 62 which are arranged in the same plane as the first photodiode 08 and the second photodiode 09. The four photodiodes 08, 09, 61, 62 are identically configured and are arranged at the same distance from the VCSEL 03. The four diodes 08, 09, 61, 62 are evenly distributed around the VCSEL 03, i.e., the angle between two adjacent ones of the four photodiodes 08, 09, 61, 62 is 90° in each case. Each of the four photodiodes 08, 09, 61, 62 is situated in one quadrant relative to the VCSEL 03. Each of the four photodiodes 08, 09, 61, 62 has the form of an annular sector which is arranged parallel to the untilted scale 01.

In the principle sketch, the light cone 11 is illustrated with four ray bundles, wherein the rays of the ray bundles each lie in one plane. For the description of the function, it is assumed that the light cone 11 is formed all around, i.e., over 360°. The light cone 11 is reflected by the reflective underside of the scale pan 01, wherein said cone retains the hollow conical form. A cross-section through the light cone 11 parallel to the scale pan 01 has the form of an annulus. Diametrically opposed sections of the annular form of the cross-section of the light cone 11 fall on the four photodiodes 08, 09 61, 62. As shown in the ray-path of FIG. 2, only the outer portion 12 of the corresponding section of the annular form is directed to the first photodiode 08. Similarly, only the outer portion 13 of the corresponding section of the annular form is directed to the second photodiode 09. Similarly, only an outer portion 63 of the corresponding section of the annular form is directed to the third photodiode 61. Also, only an outer portion 64 of the corresponding section of the annular form is directed to the fourth photodiode 62. The other portions of the sections of the annular form of the cross-section of the light cone 11 do not fall on the four photodiodes 08, 09, 61, 62, but are directed to the base surface 14. The base surface 14 is configured to be light-absorbent. The part 12 of the light cone 11 which is directed to the first photodiode 08; the part 13 of the light cone 11 which is directed to the second photodiode 09; the part 63 of the light cone 11 which is directed to the third photodiode 61; and the part 64 of the light cone 11 which is directed to the fourth photodiode 62, are identical in relation to their geometric and photometric properties.

If the scale pan 01 tilts, the light cone 11 is reflected asymmetrically from the underside of the tilted scale pan 02 (shown in FIG. 3). Consequently, the proportions 12, 13, 63, 64 of the annular form of the cross-section of the light cone 11 which falls on the four photodiodes 08, 09, 61, 62 are changed. In a particular case it is possible for the difference between the proportions 12 and 13 or 63 and 64 to remain equal to zero despite a tilt. This depends on the direction in which the scale pan 02 is tilted, i.e., about which rotation axis the scale pan 02 is tilted. If the scale pan 02 is tilted about a rotation axis arranged perpendicular to the plane defined by the first photodiode 08, the second photodiode 09 and the VCSEL 03, it is only the difference between the proportion 12 of the light cone 11 which is directed to the first photodiode 08 and the proportion 13 of the light cone 11 which is directed to the second photodiode 09 which changes. The difference between the proportion 63 of the light cone 11 which is directed to the third photodiode 61 and the proportion 64 of the light cone 11 which is directed to the fourth photodiode 62 remains unchanged with this type of tilting. If, however, the scale pan 02 is tilted about a rotation axis which lies at an arbitrary angle of inclination to the arrangement comprising the four photodiodes 08, 09, 61, 62, each of the four proportions 12, 13, 63, 64 which are directed to the four photodiodes 08, 09, 61, 62 changes. The arrangement of the four photodiodes 08, 09, 61, 62 in four quadrants enables measurement of tilts about a first rotation axis of the scale pan and tilts about a rotation axis perpendicular to the first rotation axis.

The above description of the preferred embodiments has been given by way of example. From the disclosure given, those skilled in the art will not only understand the present invention and its attendant advantages, but will also find apparent various changes and modifications to the structures and methods disclosed. For example, the cross sections of the forms cast by the light as emitted, shaped, and/or reflected, are not limited to circular or annular shapes, but rather include any sections or other modifications of these forms. Also, if processed correspondingly, the sensors do not need to be identically shaped and/or positioned to measure identical light quantities for an untilted position of the pan so long as the light quantities are processed to account for the differences in shape and/or position. Also, the sensors could be positioned underneath and aligned with orifices in the base surface 14, rather than be placed between the scale pan and the base surface. The applicant seeks, therefore, to cover all such changes and modifications as fall within the spirit and scope of the invention, as defined by the appended claims, and equivalents thereof.

What is claimed is:

1. A weighing scale, comprising:
a scale pan supported or suspended on at least one force transducer of a force measuring system and coupled to or comprising a reflecting surface, wherein the reflecting surface tilts in conformance with a tilting of the scale pan;
a corner load sensor configured to measure the tilt of the scale pan relative to the force transducer, wherein the corner load sensor comprises:
at least one light beam source configured to emit a first light beam and a second light beam toward the reflecting surface, wherein the first light beam and the second light beam are each inclined relative to a perpendicular of the reflecting surface in an untilted position of the scale pan;
a first optical sensor toward which, in the untilted position, a predetermined portion of the first light beam reflected by the reflecting surface is directed;
a second optical sensor toward which, in the untilted position, a predetermined portion of the second light beam reflected by the reflecting surface is directed; and
an evaluating unit configured to determine the tilt of the scale pan in accordance with a light quantity measured with the first optical sensor and a light quantity measured with the second optical sensor.

2. The scale as claimed in claim 1, wherein the reflecting surface is formed by a planar underside of the scale pan or by a planar underside of a lower pan which is rigidly connected to the scale pan.

3. The scale as claimed in claim 1, wherein the light beam source is arranged beneath the scale pan and is oriented in the direction of the perpendicular of the reflecting surface of the scale pan in the untilted position, and wherein the perpendicular of the reflecting surface extends through the center of gravity of the scale pan.

4. The scale as claimed in claim 1, wherein the first light beam and the second light beam have identical geometric and photometric properties, and form an identical angle relative to the perpendicular of the reflecting surface of the scale pan in the untilted position, and wherein the first light beam and the second light beam define a single plane together with the perpendicular.

5. The scale as claimed in claim 4, wherein a horizontal symmetry axis of the scale pan in the untilted position lies in the single plane defined by the first light beam and the second light beam.

6. The scale as claimed in claim 1:
wherein the light beam source is further configured to emit a third light beam and a fourth light beam toward the reflecting surface;
wherein the third light beam and the fourth light beam are each inclined relative to the perpendicular of the reflecting surface in the untilted position and form an identical angle relative to the perpendicular;
wherein, together with the perpendicular, the third and fourth light beams define a further single plane which is perpendicular to the single plane defined by the first light beam and the second light beam; and
further comprising a third optical sensor and a fourth optical sensor;
wherein, in the untilted position, a predetermined portion of the third light beam reflected by the reflecting surface is directed toward the third optical sensor; and
wherein, in the untilted position, a predetermined portion of the fourth light beam reflected by the reflecting surface is directed toward the fourth optical sensor.

7. The scale as claimed in claim 1, wherein the light beam source consists of a single light source.

8. The scale as claimed in claim 7, wherein the light beam source emits a light cone, and wherein the light cone comprises the first light beam and the second light beam as distinct light beams.

9. The scale as claimed in claim 8, wherein the light cone is completely filled with light and wherein the reflecting surface has an annular form arranged concentrically with the light cone.

10. The scale as claimed in claim 8, wherein the light cone is a hollow cone surrounding a dark central cone.

11. The scale as claimed in claim 10, wherein the light beam source comprises at least one of an annular lens and an annular aperture to form the hollow light cone.

12. The scale as claimed in claim 7, wherein the light source comprises a Vertical Cavity Surface Emitting Laser.

13. The scale as claimed in claim 12, wherein the first optical sensor and the second optical sensor both consist essentially of a photodiode and are arranged together with the Vertical Cavity Surface Emitting Laser on a silicon substrate, wherein the two photodiodes are arranged rotationally symmetrically with respect to the Vertical Cavity Surface Emitting Laser.

14. The scale as claimed in claim 4, wherein the predetermined portion of the reflected first light beam which, in the untilted position, is directed to the first optical sensor, and the predetermined portion of the reflected second light beam which, in the untilted position, is directed to the second optical sensor, have identical geometric and photometric properties, and wherein, in a tilted position, a portion of the first light beam reflected onto the first optical sensor is less than the predetermined portion of the reflected first light beam, whereas a portion of the second light beam reflected onto the second optical sensor is greater than the predetermined portion of the reflected second light beam.

15. The scale as claimed in claim 14, wherein a portion of the reflected first light beam which, in the untilted position, is not directed to the first optical sensor is directed to a region between the first optical sensor and the light beam source and, wherein a portion of the reflected second light beam which, in the untilted position, is not directed to the second optical sensor is directed to a region between the second optical sensor and the light beam source.

16. A method for measuring tilt of a scale pan, caused by corner loads, relative to a force transducer of a force measuring system supporting or carrying the scale pan, comprising:
directing a first light beam and a second light beam toward a reflecting surface on an underside of an arrangement comprising the scale pan, wherein the first light beam and the second light beam are inclined relative to a perpendicular of the reflecting surface in an untilted position of the scale pan;
measuring a proportion of the first light beam reflected by the reflecting surface and falling on a first optical sensor as a first light quantity;
measuring a proportion of the second light beam reflected by the reflecting surface and falling on a second optical sensor as a second light quantity;
comparing the first light quantity and the second light quantity ; and
determining the tilt of the scale pan from the comparison between the first light quantity and the second light quantity.

17. The method as claimed in claim 16, further comprising:
directing a third light beam and a fourth light beam toward the reflecting surface, wherein the third light beam and the fourth light beam are inclined relative to the perpendicular of the reflecting surface in the untilted position and define, together with the perpendicular, one plane which is perpendicular to a plane defined by the first light beam and the second light beam;
measuring a proportion of the third light beam reflected by the reflecting surface and falling on a third optical sensor as a third light quantity;
measuring a proportion of the fourth light beam reflected by the reflecting surface and falling on a fourth optical sensor as a fourth light quantity;
comparing the third light quantity and the fourth light quantity; and
determining the tilt of the scale pan about a first rotation axis and about a second rotation axis, respectively, from the comparison between the first light quantity and the second light quantity, and from the comparison between the third light quantity and the fourth light quantity.

18. The scale as claimed in claim 1, configured as a top-pan scale, wherein the scale pan is supported on the at least one force transducer.

19. A weighing scale, comprising:
a scale pan providing a reflecting surface that tilts in conformance with a tilt of the scale pan; and
a corner load sensor configured to measure the tilt of the scale pan, wherein the corner load sensor comprises:
at least one light source configured to project a first light beam onto the reflecting surface at an angle that is non-perpendicular to the reflecting surface in an untilted position of the reflecting surface, and to project a second light beam onto the reflecting surface at a further angle that is non-perpendicular to the reflecting surface in the untilted position; and
at least one light receiver configured to measure the first light beam reflected by the reflecting surface relative to the second light beam reflected by the reflecting surface in both the untilted position and in a tilted position of the reflecting surface.

* * * * *